US008130395B2

(12) United States Patent
Shimizu et al.

(10) Patent No.: US 8,130,395 B2
(45) Date of Patent: Mar. 6, 2012

(54) NETWORK COMMUNICATION APPARATUS

(75) Inventors: Naoki Shimizu, Tokyo (JP); Shigeru Nakamura, Kanagawa (JP); Susumu Fujioka, Kanagawa (JP); Tomohito Kajiwara, Tokyo (JP); Takashi Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1085 days.

(21) Appl. No.: 11/747,544

(22) Filed: May 11, 2007

(65) Prior Publication Data

US 2007/0280219 A1 Dec. 6, 2007

(30) Foreign Application Priority Data

May 31, 2006 (JP) .................................. 2006-151928

(51) Int. Cl.
*G06F 3/12* (2006.01)
*G06K 1/00* (2006.01)

(52) U.S. Cl. ...................... 358/1.15; 358/1.13; 358/1.16

(58) Field of Classification Search .................... 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

2003/0193696 A1* 10/2003 Walker et al. ................. 358/402
2004/0097188 A1* 5/2004 Tanimoto ..................... 455/3.06

FOREIGN PATENT DOCUMENTS

| JP | 2002-44363 | 2/2002 |
| JP | 2004-96326 | 3/2004 |
| JP | 2005-80025 | 3/2005 |

* cited by examiner

*Primary Examiner* — Thierry Pham
(74) *Attorney, Agent, or Firm* — Oblon, Spivak, McClelland, Maier & Neustadt, L.L.P.

(57) ABSTRACT

A disclosed network communication apparatus for performing communication via an IP network includes: a packet generation unit generating packets for call connection including facsimile communication capability and voice capability; and a communication control unit requesting a target network communication apparatus for connection using the packets for call connection upon facsimile transmission and establishing a facsimile communication channel and a voice channel to perform the facsimile transmission. Upon facsimile transmission, the communication control unit requests the target apparatus for connection using the packets for call connection. When the target apparatus rejects the connection request, the communication control unit reissues a call to the target apparatus and requests the target apparatus for connection of a voice channel to establish the voice channel, and then the communication control unit receives a request for connection of a facsimile communication channel from the target apparatus to establish the facsimile communication channel.

10 Claims, 11 Drawing Sheets

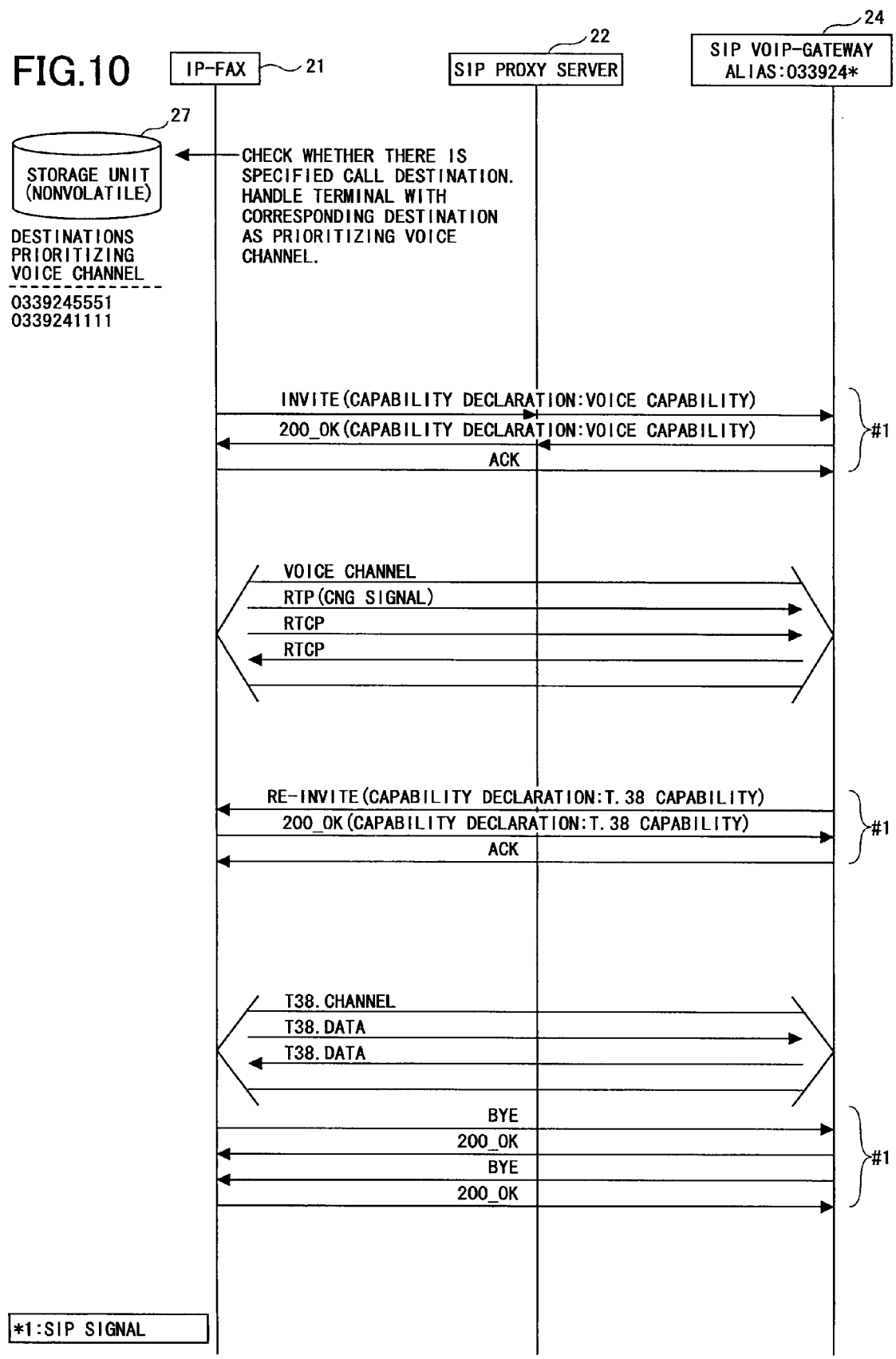

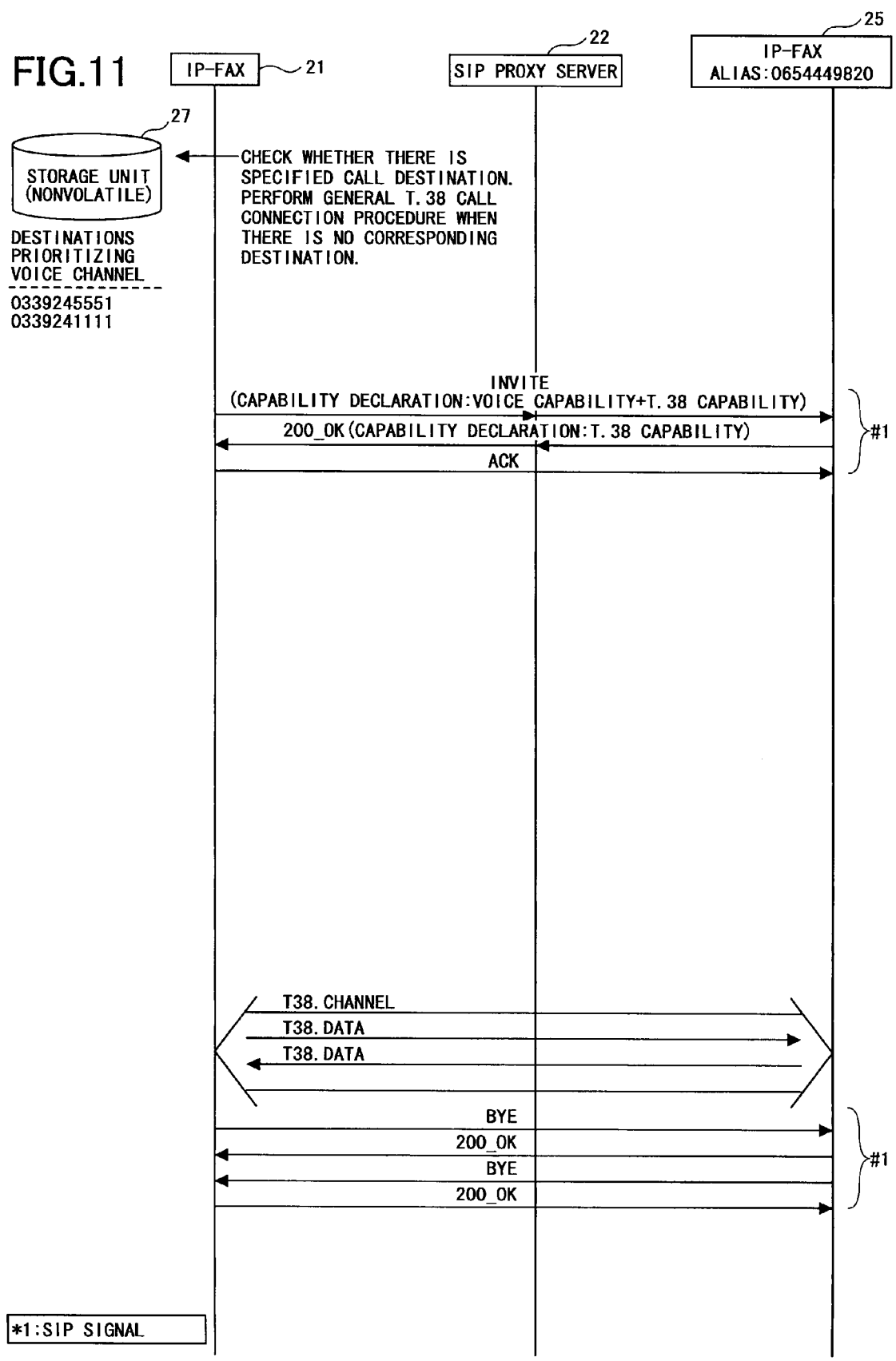

NETWORK COMMUNICATION APPARATUS

BACKGROUND OF THE INVENTION

1. Field of the Invention

The present invention relates to a network communication apparatus for securing establishment of call connection. In the following, basic terms used in the specification are described.

1. JT-H323 defines general regulations for exchanging multimedia information such as voice information, image information, and the like on an IP network. JT-H323 also defines H.323 faststart.
2. JT-H225.0 defines details of message signals for connecting calls used in H.323.
3. JT-H245 defines a procedure (Slow Start) after call connection based on JT-H225.0 is established.
4. JT-T38 defines real-time communication procedures of facsimile on the IP network.
5. H.245 tunneling is a method for exchanging H.245 signals on an H.323 session while eliminating the necessity of creating a dedicated session. Normally, when H.245 signals are exchanged between terminals, a TCP session dedicated to H.245 is connected other than the H.323 session and the exchange is performed on the session. Specifically, an H.323 signal referred to as "FACILITY" is used for tunneling. The FACILITY is an H.323 signal for functionality expansion along with SETUP, CONNECT, and the like. The FACILITY has a header common to H.323 signals and an area for functionality expansion. By having data based on the H.245 standard in the area for functionality expansion, it is possible to exchange H.245 signals on the H.323 "FACILITY".

2. Description of the Related Art

Upon using real-time Internet facsimile, namely, IP-FAX, call connection procedures between communication terminals are standardized in JT-H323 and RFC3261. However, there is a nonnegligible difference of call connection procedures on the market depending on VOIP device vendors. For example, Cisco Systems, Inc. having a large share in the VoIP market supplies products that are not based on the standards, so that when products of other companies are solely based on the standards, call connection may not be established.

The problem of connectivity upon using IP-FAX results from specifications of VoIP devices on the market such that the VoIP devices are assumed to be connected to IP-Phones. In other words, in a call connection procedure, connection of a voice channel is established by priority and then connection of a facsimile communication channel is established upon request. However, call connection is not established for products that do not follow such a call connection procedure.

In particular, in some VoIP devices, although a connection signal "INVITE" is transmitted first in a call connection procedure based on RFC3261(SIP), when a T.38 capability is declared in the signal, the call is immediately terminated. In order to maintain connectivity to such devices, it is necessary to declare only a voice capability in the INVITE signal. Further, there is a demand for performing a general call connection operation based on the standards other than communication with devices of a specific vendor.

In patent document 1, a voice session and a facsimile data session are established at the same time and data exchange is enabled respectively, so that both sessions are separately used in accordance with capability of a target terminal. However, in some VoIP devices following the call connection procedure based on RFC3261(SIP), when the facsimile data session is established, the call is immediately terminated at that time, so that patent document 1 does not meet the above-mentioned demand.

Patent Document 1: Japanese Laid-Open Patent Application No. 2004-96326

SUMMARY OF THE INVENTION

It is a general object of the present invention to provide an improved and useful network communication apparatus in which the above-mentioned problems are eliminated.

A more specific object of the present invention is to provide a network communication apparatus that can effectively secure establishment of call connection to a device preferentially establishing a voice channel.

According to one aspect of the present invention, there is provided a network communication apparatus for performing communication via an IP network, the network communication apparatus comprising: a packet generation unit generating packets for call connection including facsimile communication capability and voice capability; and a communication control unit requesting a target network communication apparatus for connection using the packets for call connection upon facsimile transmission and establishing a facsimile communication channel and a voice channel so as to perform the facsimile transmission, wherein upon facsimile transmission, the communication control unit requests the target network communication apparatus for connection using the packets for call connection, when the target network communication apparatus rejects the connection request, the communication control unit reissues a call to the target network communication apparatus and requests the target network communication apparatus for connection of a voice channel so as to establish the voice channel, and then the communication control unit receives a request for connection of a facsimile communication channel from the target network communication apparatus so as to establish the facsimile communication channel.

According to another aspect of the present invention, the network communication apparatus includes: a storage unit storing a destination of the target network communication apparatus as destination information, wherein the storage unit stores destination information on a destination to which the facsimile communication channel is established by reissuing the call.

According to another aspect of the present invention, in the network communication apparatus, the communication control unit compares specified destination information with the destination information stored in the storage unit upon facsimile transmission, when corresponding destination information is present, the communication control unit requests the target network communication apparatus for connection of a voice channel so as to establish the voice channel, and then the communication control unit receives a request for connection of a facsimile communication channel from the target network communication apparatus so as to establish the facsimile communication channel.

The network communication apparatus according to the present invention reissues the call and requests connection of the voice channel after confirming that the target network communication apparatus is one of those apparatuses which immediately terminate the call upon request of connection of the facsimile communication channel. Thus, it is possible to effectively secure establishment of call connection to a device preferentially establishing the voice channel. In particular, regarding specific vendors, by storing information on destinations requiring a particular call connection characteristic of vendors, it is possible to separately use the standard call connection procedure and a vendor-specific call connection procedure for destinations specified thereafter.

Other objects, features and advantage of the present invention will become more apparent from the following detailed description when read in conjunction with the accompanying drawings.

BRIEF DESCRIPTION OF THE DRAWINGS

FIG. 10 is a sequence diagram showing an example when a destination corresponding to a call destination is stored in a storage unit 27 in operation 6; and FIG. 11 is a sequence diagram showing another example when a destination corresponding to a call destination is stored in the storage unit 27 in operation 6.

DETAILED DESCRIPTION OF THE PREFERRED EMBODIMENTS

In the following, embodiments of the present invention will be described with reference to the accompanying drawings.

Figure 1:
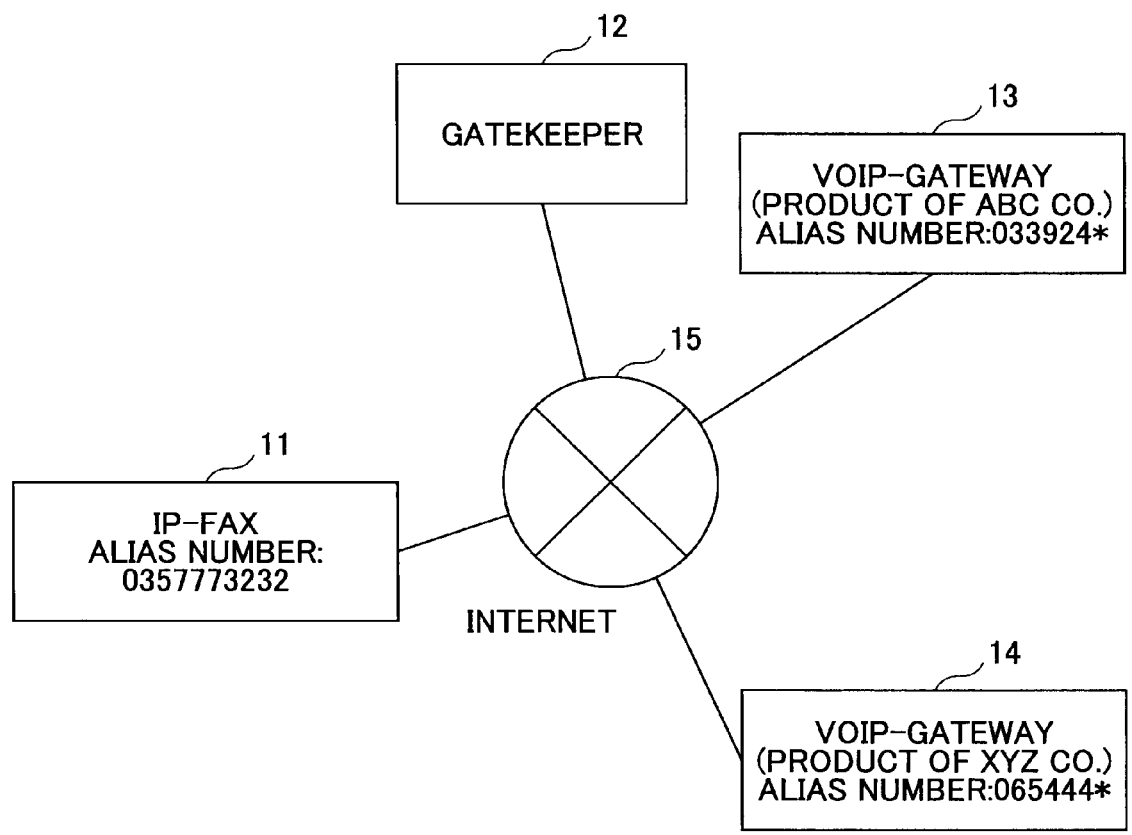
FIG. 1 is a configuration diagram of a network including a network communication apparatus of an IP-FAX based on H.323.
Figure 2:
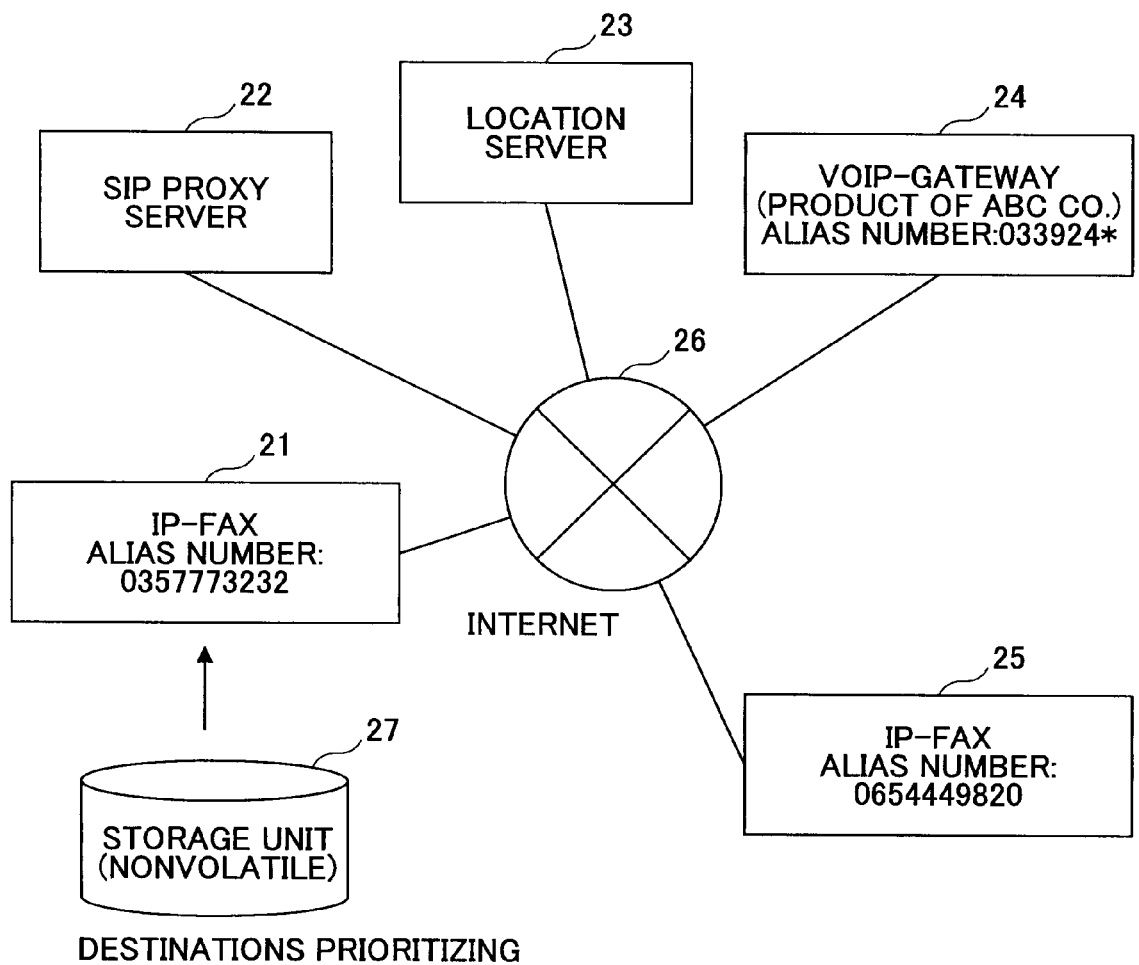
FIG. 2 is a configuration diagram of a network including a network communication apparatus of an IP-FAX based on SIP.

FIG. 1 and FIG. 2 are configuration diagrams of a network including a network communication apparatus according to the present invention. Both configuration diagrams are different in that whether the IP-FAX invention is based on H.323 or SIP.

[Device Configuration According to the IP-FAX Invention Based on H.323]

FIG. 1 shows the configuration. Numeral 11 designates an IP-FAX according to the present invention. A gatekeeper 12 manages alias phone numbers and IP addresses of H.323 terminals in a zone under control and mainly resolves the alias phone numbers into IP addresses. Numerals 13 and 14 designate H.323-enabled VoIP-gateways as devices for performing media communication between an analog FAX and an IP-FAX connected to the gateways. Each device includes a packet generation unit generating packets for call connection based on JT-H245 and JT-H323 including facsimile communication capability and voice capability based on JT-T38 and a communication control unit requesting target devices for connection using the packets for call connection upon facsimile transmission and establishing a facsimile communication channel and a voice channel so as to perform facsimile transmission. In the example of FIG. 1, the gateway 13 is assumed to be a product of ABC Co. and the gateway 14 is assumed to be a product of XYZ Co. as other vendor.

[Device Configuration According to the IP-FAX Invention Based on SIP]

FIG. 2 shows the configuration. Numeral 21 designates an IP-FAX according to the present invention. An SIP proxy server 22 has a function of proxying an SIP method between SIP terminals in a relevant domain based on number destination information (alias number, also referred to as SIP-URI). A location server 23 stores a relationship between number information (SIP-URI) and an IP address as a set of information regarding each SIP terminal in the domain. An SIP proxy server 22 refers to the information in the location server 23 upon proxying. The IP terminals 21, 24, and 25 are devices having a media communication function based on SIP. Each device includes a packet generation unit generating packets for call connection based on RFC3261 including facsimile communication capability and voice capability based on JT-T38 and a communication control unit requesting target devices for connection using the packets for call connection upon facsimile transmission and establishing a facsimile communication channel and a voice channel so as to perform facsimile transmission. In the example of FIG. 2, the gateway 24 is assumed to be a product of ABC Co. and the IP-FAX 21 (object of the present invention) includes a nonvolatile storage unit 27 storing specific destination information.

In the following, process operations of the network communication apparatus according to the present invention are described using the IP-FAXes (11 and 21) in FIG. 1 and FIG. 2 as the object of the present invention.

[Operation 1]

Figure 3:
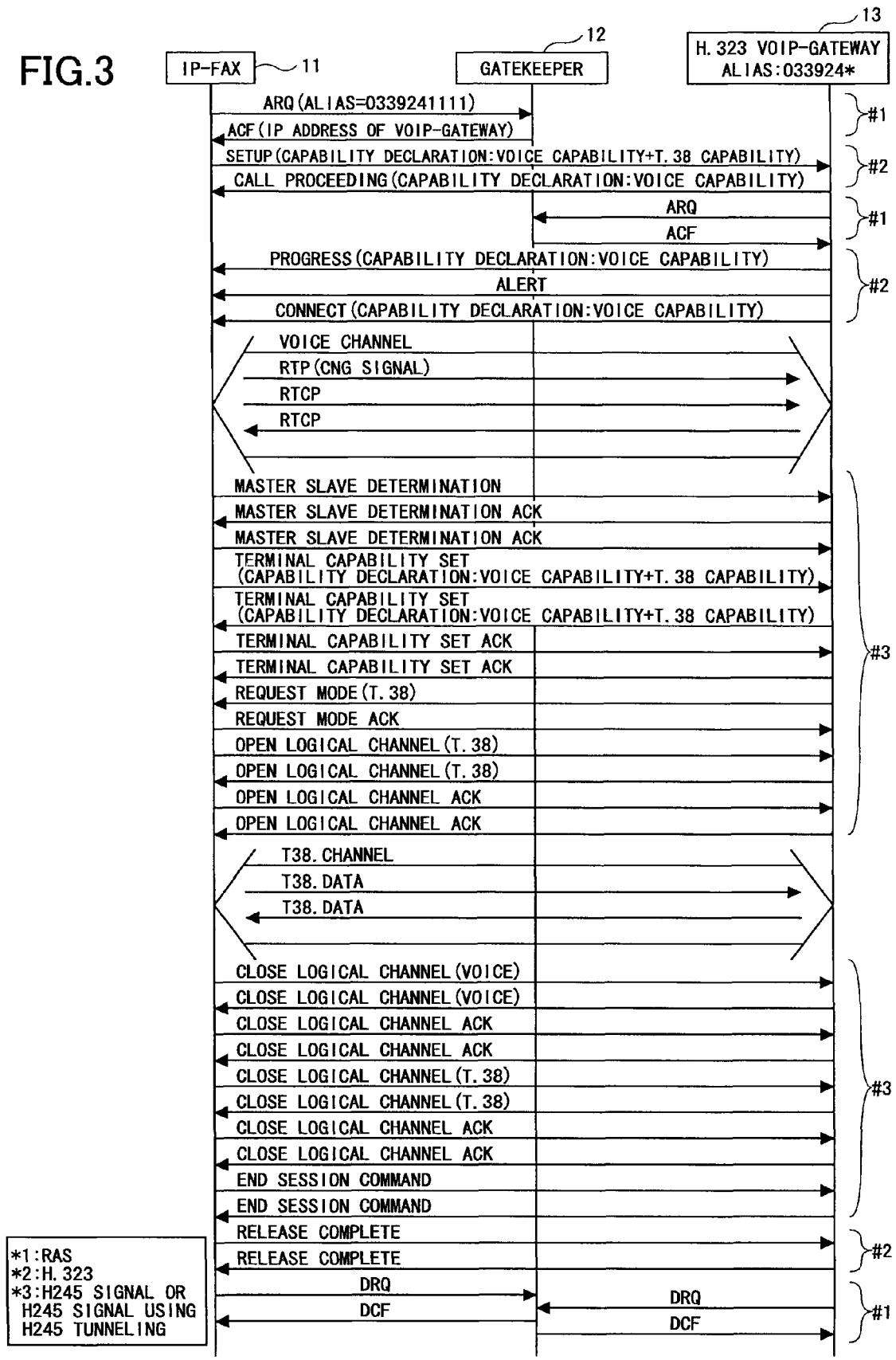
FIG. 3 is a sequence diagram showing an operational example as operation 1 when an IP-FAX 11 issues a call to a VoIP-gateway 13 in FIG. 1.

The following describes an operational example when the IP-FAX 11 issues a call to the VoIP-gateway 13 in FIG. 1 with reference to a sequence diagram of FIG. 3.

A user of the IP-FAX performs facsimile transmission specifying a destination "0339241111".

The IP-FAX transmits an ARQ signal to the gatekeeper so as to secure a band for address resolution and facsimile communication. When the gatekeeper receives the ARQ signal, the gatekeeper confirms a start of the call of the terminal.

The IP-FAX receives an ACF signal from the gatekeeper and obtains an IP address of a destination terminal of facsimile (VoIP-gateway).

The IP-FAX transmits an H.323 SETUP signal to the VoIP-gateway. Both voice capability and T.38 capability are declared in faststart of the signal taking into consideration a possibility that the communication terminal of the destination may require connection of a voice channel. The voice channel is not necessary for the IP-FAX as long as a T.38 channel is connected.

The IP-FAX receives CallProceeding, PROGRESS, ALERT, and CONNECT signals from the VoIP-gateway. In faststart of the signals, only the voice capability is declared.

On the JT-T38 standard, "when the T.38 capability is not declared in faststart, an H.323 procedure may be immediately terminated by transmitting a ReleaseComplete signal". In this embodiment, even when the T.38 capability is not declared in faststart from the call receiving terminal, the voice channel is provisionally connected and communication is maintained. After fastconnect from SETUP to CONNECT is ended, there are cases where a procedure determined in the JT-H245 standard is performed as in the present embodiment. Normally, a TCP session for H.245 other than H.323 is established between both terminals based on information described in the H.323 PROGRESS signal. Thereafter, H.245 signals are exchanged on the session. On the other hand, there is another method referred to as H.245 tunneling. In this method, H.245 signals are exchanged on the H.323 session without creating a session dedicated to H.245. In the present embodiment, a general H.245 procedure is described without using the H.245 tunneling.

The IP-FAX establishes a voice channel to the call destination terminal.

Voice data (RTP) and signals for controlling voice data (RTCP) are exchanged on the established voice channel. In the present embodiment, pseudo voice data (RTP and RTCP) is exchanged with the target communication terminal (VoIP-gateway) on the voice channel. When the IP-FAX is a caller as in the present embodiment, the IP-FAX transmits CNG signals as RTP. Further, in the present embodiment, the established voice channel is maintained without being immediately disconnected after the T.38 channel is established and the voice channel is disconnected after facsimile data (T.38 data) communication is ended.

Then, an H.245 MasterSlaveDetermination signal and MasterSlaveDeterminationAck signals are exchanged and a master-slave relationship is created between the terminals.

H.245 TerminalCapabilitySet signals are exchanged between the terminals and capability of each device is notified to each other. In the present embodiment, both call issuing terminal and call receiving terminal are VoIP devices, so that the voice capability and the T.38 capability are declared.

When the H.323-enabled VoIP-gateway receives and detects T.30 facsimile signals from a G3 facsimile connected to PSTN line, the VoIP-gateway transmits an H.245 RequestMode signal and requests connection of a T.38 channel.

The IP-FAX receives the RequestMode (T.38) from the VoIP-gateway and establishes the T.38 channel between the terminals. H.245 OpenLogicalChannel (T.38) is used for the establishment of the T.38 channel.

The IP-FAX transmits facsimile data including image data via the established T.38 channel.

After the transmission of the facsimile data is ended, the voice channel and the T.38 channel are disconnected. An H.245 CloseLogicalChannel signal is used for the disconnection of the channels.

An H.245 EndSessionCommand signal is transmitted so as to close the H.245 session. When the H.245 procedure is performed through the H.245 tunneling, this signal is not used.

An H.323 ReleaseComplete signal is transmitted so as to end the H.323 procedure.

An RAS DRQ signal is transmitted so as to notify the end of the call to the gatekeeper.

Through the operation in this manner, it is possible to resolve connectivity to the VoIP device establishing the connection of the voice channel by priority in call issue and call reception of the IP-FAX based on JT-H323. In accordance with this, it is possible to reliably realize connectivity that is difficult to secure by merely complying with the JT-H323 standard.

[Operation 2]

Figure 4:
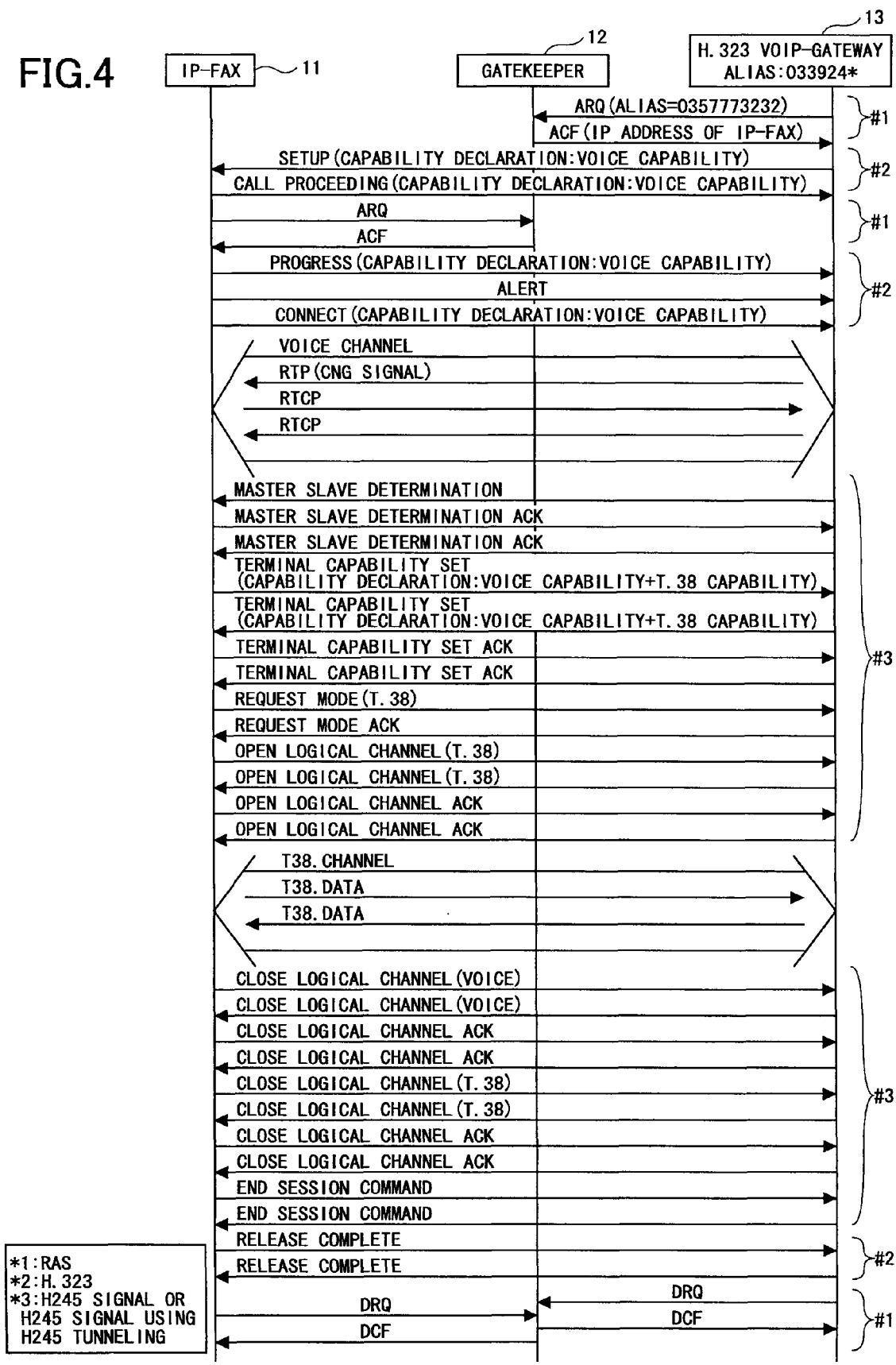
FIG. 4 is a sequence diagram showing an operational example as operation 2 when the IP-FAX 11 receives a call from the VoIP-gateway 13 in FIG. 1.

The following describes an operational example when the IP-FAX 11 receives the call from the VoIP-gateway 13 in FIG. 1 with reference to a sequence diagram of FIG. 4.

When the IP-FAX receives the SETUP signal, the IP-FAX confirms call reception and checks whether the T.38 capability necessary for facsimile communication is declared in faststart of the SETUP signal. In the present embodiment, the T.38 capability is not declared in faststart and only the voice capability is declared. In the present embodiment, the voice channel is connected without immediately terminating communication even when the T.38 capability is not declared in faststart upon call reception.

The IP-FAX transmits the H.323 CallProceeding signal in which the voice capability is declared in faststart.

The IP-FAX transmits the RAS ARQ signal to the gatekeeper and receives the ACF signal. The signals are intended to notify the start of the call to the gatekeeper and to secure a band for facsimile signals.

The IP-FAX transmits H.323 PROGRESS, ALERT, and CONNECT signals. In the PROGRESS and CONNECT signals, the voice capability is declared in faststart in the same manner as in the CallProceeding signal.

After fastconnect from SETUP to CONNECT is ended, there are cases where a procedure determined in the JT-H245 standard is performed as in the present embodiment. Normally, a TCP session for H.245 other than H.323 is established between both terminals based on information described in the H.323 PROGRESS signal. Thereafter, H.245 signals are exchanged on the session. On the other hand, there is another method referred to as H.245 tunneling. In this method, H.245 signals are exchanged on the H.323 session without creating a session dedicated to H.245. In the present embodiment, a general H.245 procedure is described without using the H.245 tunneling.

The IP-FAX establishes the voice channel with the call destination terminal.

Voice data (RTP) and signals for controlling voice data (RTCP) are exchanged on the established voice channel. In the present embodiment, pseudo voice data (RTP and RTCP) is exchanged with the target communication terminal (VoIP-gateway) on the voice channel. Further, in the present embodiment, the established voice channel is maintained without being immediately disconnected after the T.38 channel is established and the voice channel is disconnected after facsimile data (T.38 data) communication is ended.

Then, the H.245 MasterSlaveDetermination signal and the MasterSlaveDeterminationAck signals are exchanged and a master-slave relationship is created between the terminals.

The H.245 TerminalCapabilitySet signals are exchanged between the terminals and capability of each device is notified to each other. In the present embodiment, both call issuing terminal and call receiving terminal are VoIP devices, so that the voice capability and the T.38 capability are declared. The IP-FAX transmits the RequestMode (T.38) to the VoIP-gateway so as to establish the T.38 channel in addition to the established voice channel.

The T.38 channel is established between both terminals. The H.245 OpenLogicalChannel (T.38) is used for the establishment of the T.38 channel.

The IP-FAX transmits facsimile data including image data via the established T.38 channel.

After the transmission of the facsimile data is ended, the voice channel and the T.38 channel are disconnected. The H.245 CloseLogicalChannel signal is used for the disconnection of the channels.

The H.245 EndSessionCommand signal is transmitted so as to close the H.245 session. When the H.245 procedure is performed through the H.245 tunneling, this signal is not used.

The H.323 ReleaseComplete signal is transmitted so as to end the H.323 procedure.

The RAS DRQ signal is transmitted so as to notify the end of the call to the gatekeeper.

Through the operation in this manner, it is possible to resolve connectivity to the VoIP device establishing the connection of the voice channel by priority in call issue and call reception of the IP-FAX based on JT-H323. In accordance with this, it is possible to reliably realize connectivity that is difficult to secure by merely complying with the JT-H323 standard.

[Operation 3]

Figure 5:
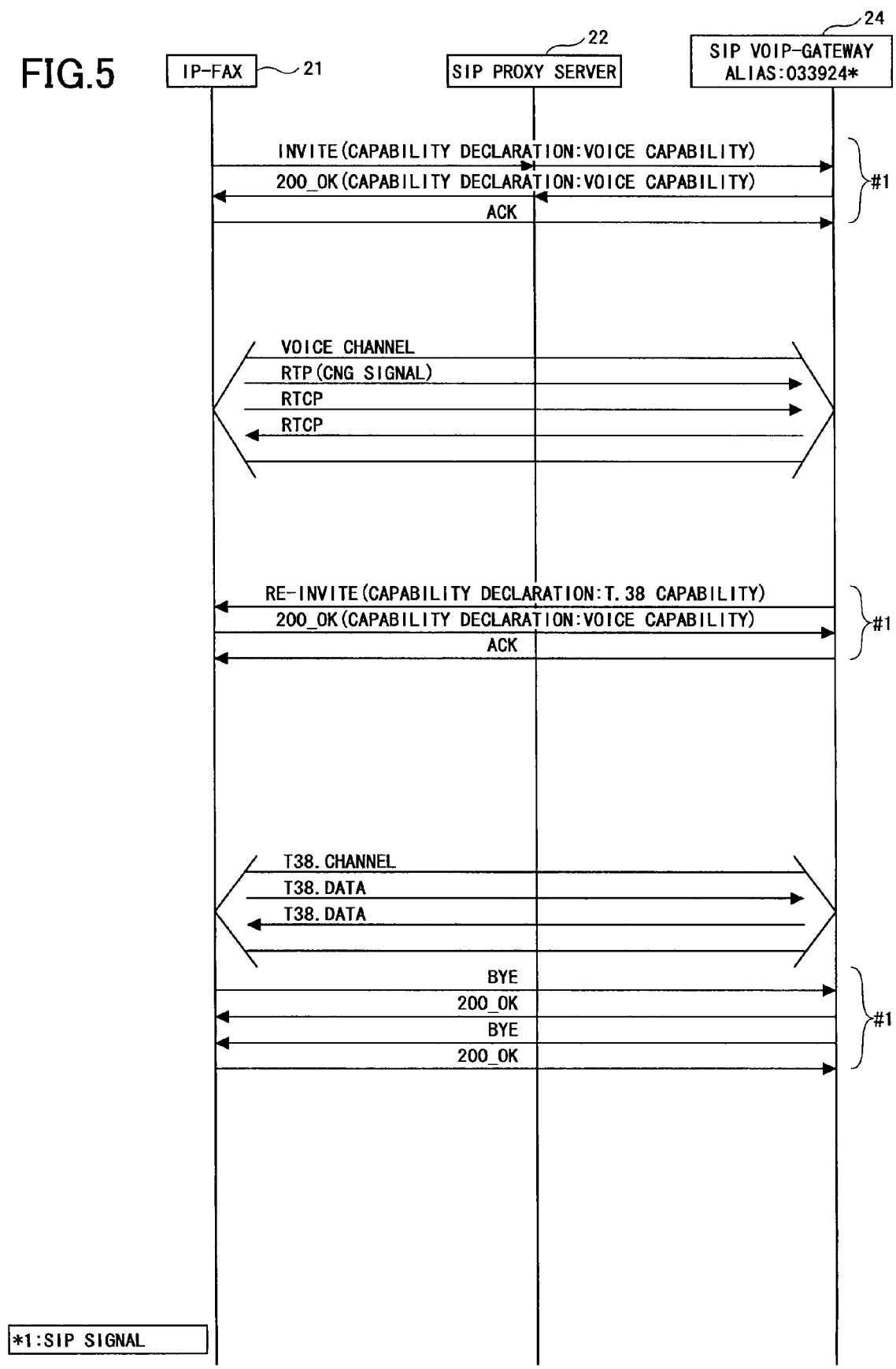
FIG. 5 is a sequence diagram showing an operational example as operation 3 when an IP-FAX 21 issues a call to a VoIP-gateway 24 in FIG. 2.

The following describes an operational example when the IP-FAX 21 issues the call to the VoIP-gateway 24 in FIG. 2 with reference to a sequence diagram of FIG. 5.

The user of the IP-FAX performs facsimile transmission specifying a destination "0339241111".

The IP-FAX first transmits an INVITE signal to the SIP proxy server 22 in FIG. 2. In a general method, all media types to request connection to the target communication terminal are described in an SDP field of the INVITE signal. However, in the present embodiment, the T.38 capability necessary for facsimile communication is not declared in the SDP field of the INVITE signal and only the voice capability is declared taking into consideration operations of the target communication terminal assumed to be a voice terminal and operations of the VoIP-gateway immediately terminating communication when capability other than the voice capability is declared in the SDP field of the INVITE signal.

The SIP proxy server accesses the location server and resolves Request-URI (information including destination information "0339241111" and domain information) in the received INVITE signal into an IP address of the proxy destination. The proxy server proxies the received INVITE to the IP address obtained as a result of the resolution.

The VoIP-gateway receives the INVITE signal and transmits a 200_OK signal in which the voice capability is declared in the SDP field. The signal is transmitted to the IP-FAX via the SIP proxy server.

When the IP-FAX receives the 200_OK signal, the IP-FAX transmits an ACK signal to the VoIP-gateway and the voice channel is established between the IP-FAX and the VoIP-gateway.

Voice data (RTP) and signals for controlling voice data (RTCP) are exchanged on the established voice channel. In the present embodiment, pseudo voice data (RTP and RTCP) is exchanged with the target communication terminal (VoIP-gateway) on the voice channel. When the IP-FAX is a caller as in the present embodiment, the IP-FAX transmits CNG signals as RTP. Further, in the present embodiment, the established voice channel is maintained without being immediately disconnected after the T.38 channel is established and the voice channel is disconnected after facsimile data (T.38 data) communication is ended.

When the VoIP-gateway receives and detects T.30 facsimile signals from the G3 facsimile connected to PSTN line, the VoIP-gateway transmits a re-INVITE signal in which the T.38 capability is declared in the SDP field so as to request the IP-FAX for connection of the T.38 channel.

When the IP-FAX receives the re-INVITE signal, the IP-FAX transmits the 200_OK signal in which the T.38 capability is described in the SDP field to the VoIP-gateway.

When the VoIP-gateway receives the 200_OK signal, the VoIP-gateway transmits the ACK signal to the IP-FAX and the T.38 channel is established between the IP-FAX and the VoIP-gateway.

The IP-FAX transmits facsimile data including image data via the established T.38 channel.

After the transmission of the facsimile data is ended, the voice channel and the T.38 channel are disconnected.

Both terminals transmit BYE signals to each other and the procedure of SIP is ended.

Through the operation in this manner, it is possible to resolve connectivity to the VoIP device establishing the connection of the voice channel by priority in call issue and call reception of the IP-FAX based on RFC3261(SIP). In accordance with this, it is possible to reliably realize connectivity that is difficult to secure by merely complying with the RFC3261 standard.

[Operation 4]

Figure 6:
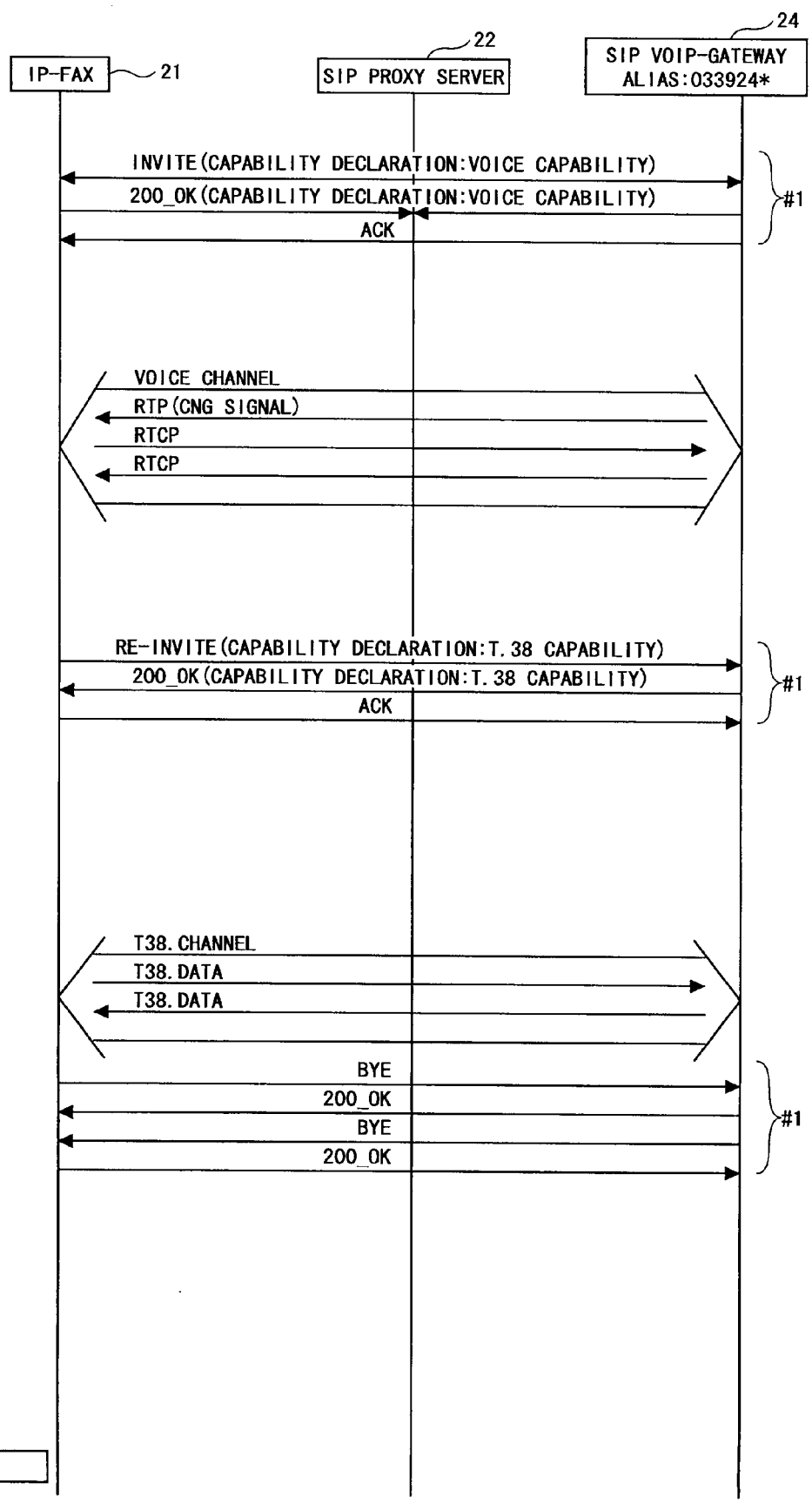
FIG. 6 is a sequence diagram showing an operational example as operation 4 when the IP-FAX 21 receives a call from the VoIP-gateway 24 in FIG. 2.

The following describes an operational example when the IP-FAX 21 receives the call from the VoIP-gateway 24 in FIG. 2 with reference to a sequence diagram of FIG. 6.

When the IP-FAX receives the INVITE signal, the IP-FAX confirms call reception and checks whether the T.38 capability necessary for facsimile communication is declared in the SDP field of the INVITE signal. In the present embodiment, the T.38 capability is not declared and only the voice capability is declared. In the present embodiment, the voice channel is connected without immediately terminating communication even when the T.38 capability is not declared in the SDP field of the INVITE signal upon call reception.

The IP-FAX transmits the 200_OK signal in which the voice capability is declared in the SDP field to the SIP proxy server.

The SIP proxy server proxies the 200_OK signal to the VoIP-gateway.

When the VoIP-gateway receives the 200_OK signal, the VoIP-gateway transmits the ACK signal to the IP-FAX and the voice channel is established between the IP-FAX and the VoIP-gateway.

Voice data (RTP) and signals for controlling voice data (RTCP) are exchanged on the established voice channel. In the present embodiment, pseudo voice data (RTP and RTCP) is exchanged with the target communication terminal (VoIP-gateway) on the voice channel. Further, in the present embodiment, the established voice channel is maintained without being immediately disconnected after the T.38 channel is established and the voice channel is disconnected after facsimile data (T.38 data) communication is ended.

The IP-FAX transmits the re-INVITE signal in which the T.38 capability is declared in the SDP field to the VoIP-gateway so as to establish the T.38 channel in addition to the voice channel and requests the VoIP-gateway for connection of the T.38 channel.

When the VoIP-gateway receives the re-INVITE signal, the VoIP-gateway transmits the 200_OK signal in which the T.38 capability is declared in the SDP field to the IP-FAX.

When the IP-FAX receives the 200_OK signal, the IP-FAX transmits the ACK signal and the T.38 channel is established between the IP-FAX and the VoIP-gateway.

The IP-FAX transmits facsimile data including image data via the established T.38 channel.

After the transmission of the facsimile data is ended, the voice channel and the T.38 channel are disconnected.

Both terminals transmit the BYE signals to each other and the procedure of SIP is ended.

Through the operation in this manner, it is possible to resolve connectivity to the VoIP device establishing the connection of the voice channel by priority in call issue and call reception of the IP-FAX based on RFC3261(SIP). In accordance with this, it is possible to reliably realize connectivity that is difficult to secure by merely complying with the RFC3261 standard.

[Operation 5]

Figure 7:
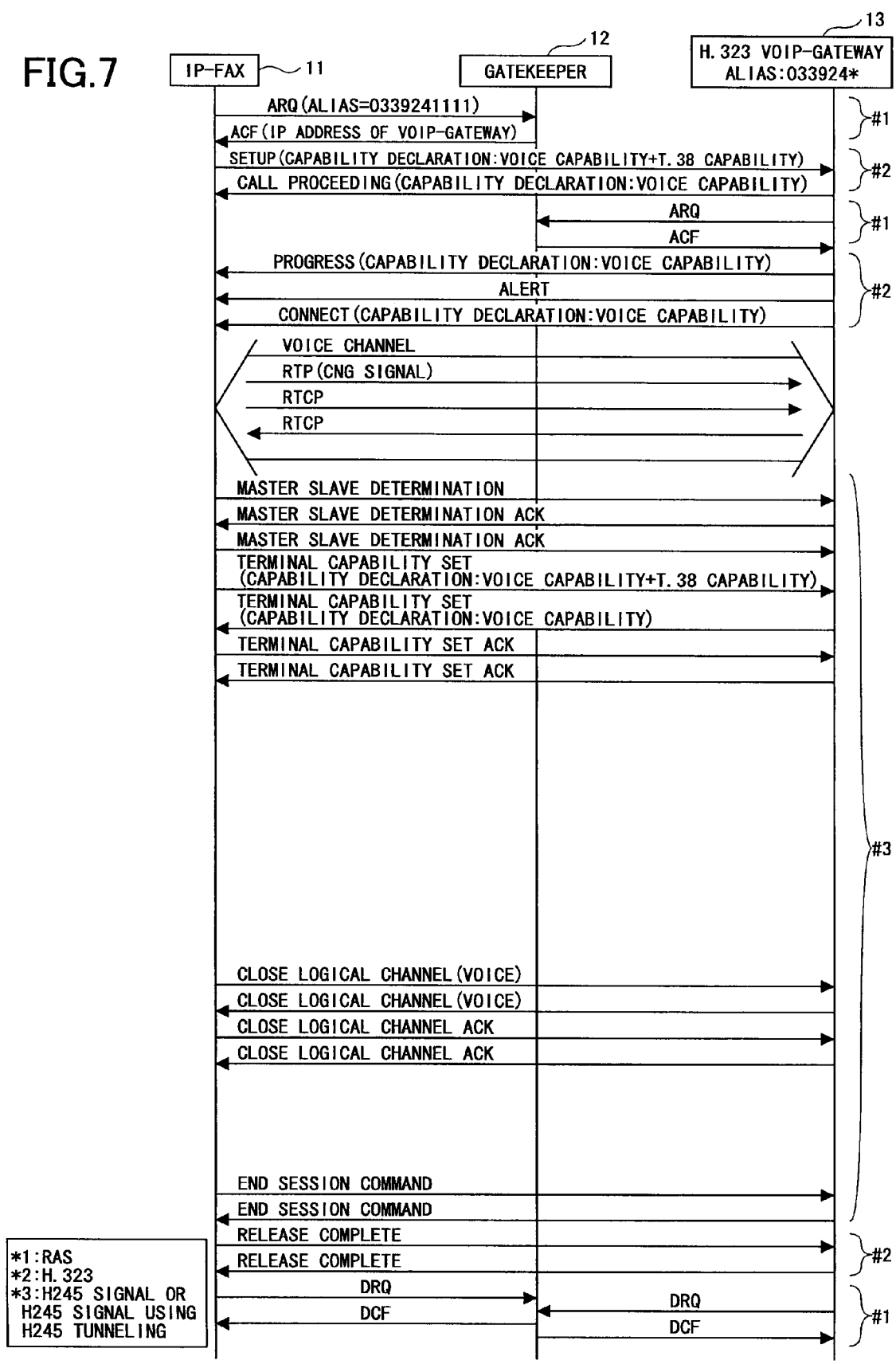
FIG. 7 is a sequence diagram showing an operational example as operation 5 when the IP-FAX 11 issues a call to the VoIP-gateway 13 in FIG. 1.

The following describes an operational example when the IP-FAX 11 issues the call to the VoIP-gateway 13 in FIG. 1 with reference to a sequence diagram of FIG. 7.

The user of the IP-FAX performs facsimile transmission specifying a destination "0339241111".

The IP-FAX transmits the ARQ signal to the gatekeeper so as to secure a band for address resolution and facsimile communication. When the gatekeeper receives the ARQ signal, the gatekeeper confirms the start of the call of the terminal.

The IP-FAX receives the ACF signal from the gatekeeper and obtains the IP address of the destination terminal of facsimile (VoIP-gateway).

The IP-FAX transmits the H.323 SETUP signal to the VoIP-gateway. Both voice capability and T.38 capability are declared in faststart of the signal taking into consideration a possibility that the communication terminal of the destination may require connection of the voice channel. The voice channel is not necessary for the IP-FAX as long as the T.38 channel is connected.

The IP-FAX receives CallProceeding, PROGRESS, ALERT, and CONNECT signals from the VoIP-gateway. In the faststart of the signals, only the voice capability is declared.

On the JT-T38 standard, "when the T.38 capability is not declared in faststart, an H.323 procedure may be immediately terminated by transmitting a ReleaseComplete signal". In this embodiment, even when the T.38 capability is not declared in faststart from the call receiving terminal, the voice channel is provisionally connected and communication is maintained. After fastconnect from SETUP to CONNECT is ended, there are cases where a procedure determined in the JT-H245 standard is performed as in the present embodiment. Normally, the TCP session for H.245 other than H.323 is established between both terminals based on information described in the H.323 PROGRESS signal. Thereafter, H.245 signals are exchanged on the session. On the other hand, there is another method referred to as H.245 tunneling. In this method, H.245 signals are exchanged on the H.323 session without creating a session dedicated to H.245. In the present embodiment, a general H.245 procedure is described without using the H.245 tunneling.

The IP-FAX establishes the voice channel with the call destination terminal.

Voice data (RTP) and signals for controlling voice data (RTCP) are exchanged on the established voice channel. Then, the H.245 MasterSlaveDetermination signal and the MasterSlaveDeterminationAck signals are exchanged and a master-slave relationship is created between the terminals.

The H.245 TerminalCapabilitySet signals are exchanged between the terminals and capability of each device is notified to each other. In the present embodiment, when the T.38 capability is not declared in CapabilityTable of the TerminalCapabilitySet signal received from the target communication terminal, communication is immediately terminated. The sequence diagram of FIG. 7 shows an example where the T.38 capability is not declared in the TerminalCapabilitySet from the target communication terminal.

When the IP-FAX receives the TerminalCapabilitySet, the IP-FAX transmits a TerminalCapabilitySetAck and closes the voice channel. The H.245 CloseLogicalChannel signal is used for the closure of the voice channel.

Both terminals exchange H.245 EndSessionCommand signals and the procedure of H.245 is ended.

Both terminals exchange H.323 ReleaseComplete signals and the procedure of H.323 is ended.

The IP-FAX transmits the RAS DRQ signal so as to notify the end of the call to the gatekeeper.

Through the operation in this manner, it is possible to immediately terminate the call at a time when the target network terminal is not available for facsimile transmission such as when the call is erroneously issued to a VoIP-gateway without T.38 capability.

[Operation 6]

Figure 8:
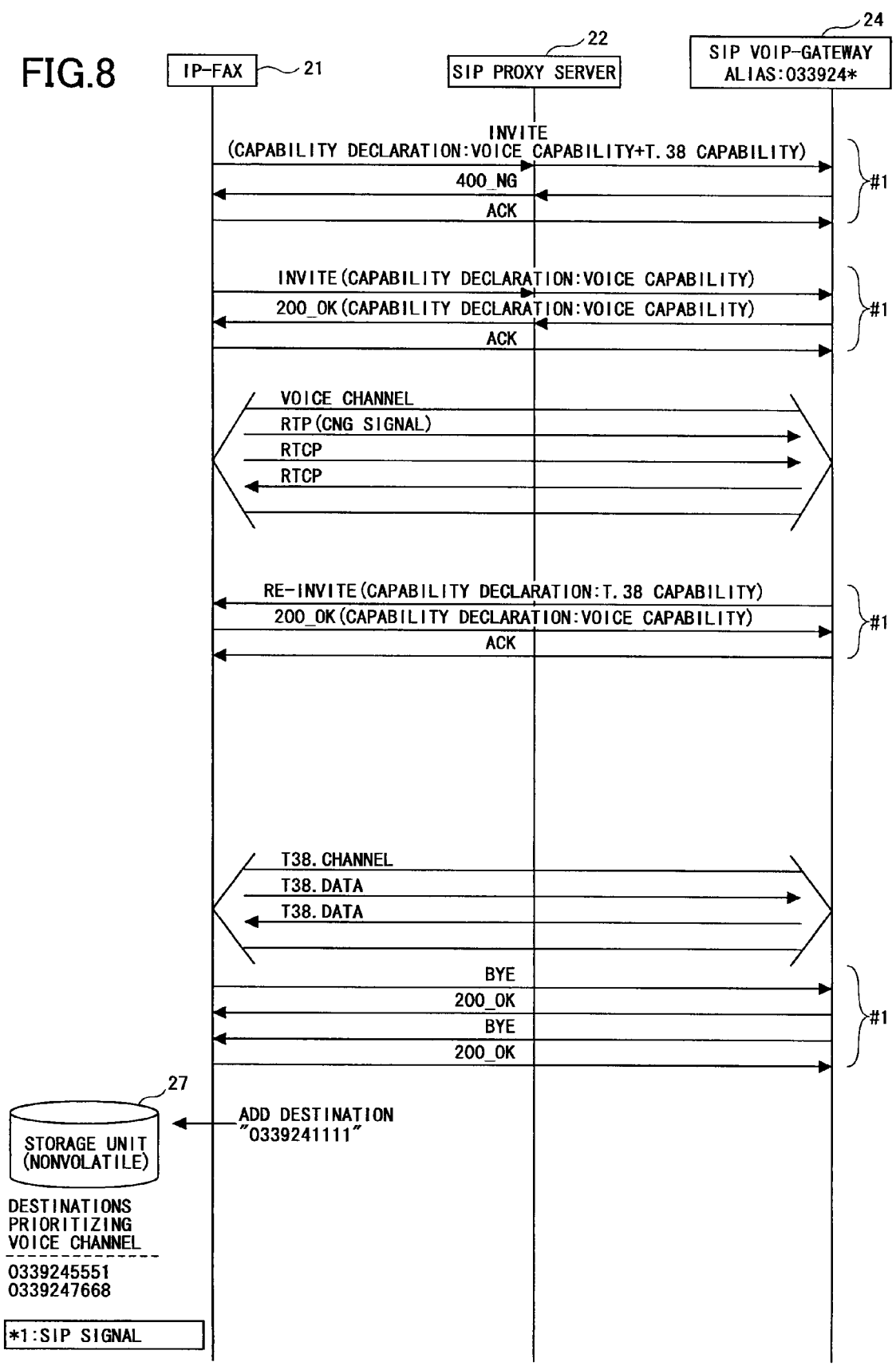
FIG. 8 is a sequence diagram showing an operational example as operation 6 when the IP-FAX 21 issues a call to the VoIP-gateway 24 in FIG. 2.

The following describes an operational example when the IP-FAX 21 issues the call to the VoIP-gateway 24 in FIG. 2 with reference to a sequence diagram of FIG. 8.

The user of the IP-FAX performs facsimile transmission specifying a destination "0339241111".

The IP-FAX first transmits the INVITE signal to the SIP proxy server 22 in FIG. 2. All media types to request connection to the target communication terminal are described in the SDP field of the INVITE signal. In the present embodiment, the T.38 capability necessary for facsimile communication is declared and the voice capability required for some VoIP-devices are declared.

The SIP proxy server accesses the location server and resolves the Request-URI (information including destination information "0339241111" and domain information) in the received INVITE signal into the IP address of the proxy destination. The proxy server proxies the received INVITE to the IP address obtained as a result of the resolution.

When the VoIP-gateway receives the INVITE signal, the VoIP-gateway confirms the media types declared in the SDP field.

The VoIP-gateway is assumed to be connected to a voice device, so that the VoIP-gateway rejects the call connection since capability other than the voice capability is declared in the SDP field of the INVITE signal and transmits 400_NG.

When capability other than the voice capability is declared in the SDP field of the INVITE signal, some VoIP-devices reject the call connection and immediately terminate communication. The sequence diagram of FIG. 8 in the present embodiment shows a case where the VoIP-gateway terminates communication when capability other than the voice capability is declared.

Figure 9:
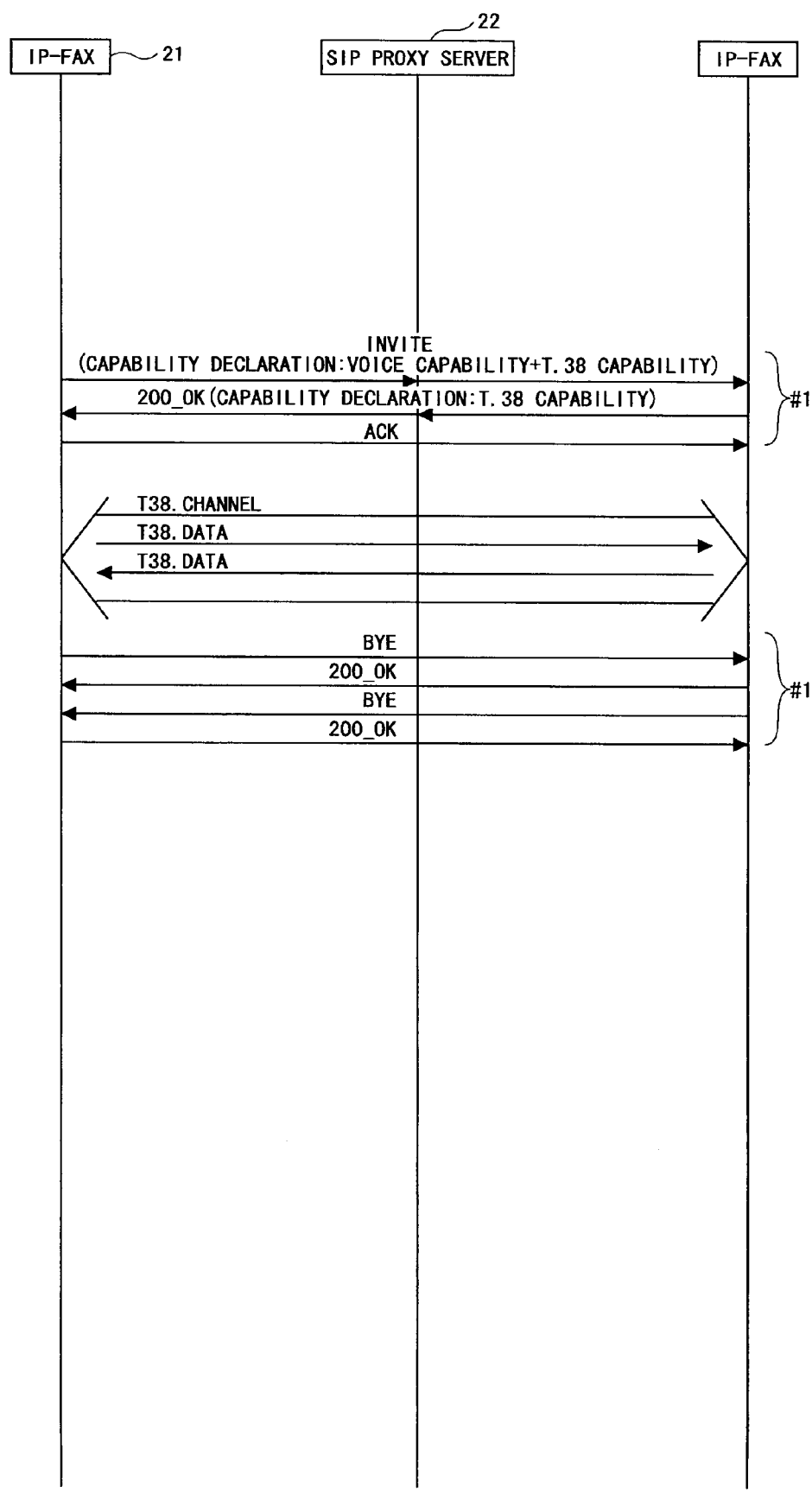
FIG. 9 is a sequence diagram showing general IP-FAX communication.

On the other hand, FIG. 9 shows a general IP-FAX sequence for comparison. When an IP-FAX as a counterpart receives the INVITE signal, the IP-FAX confirms the T.38 capability declared in the SDP field and transmits the 200_OK as a response in which only the T.38 capability is declared in the SDP field. In accordance with this, the T.38 channel is connected between both terminals and facsimile transmission is performed.

The 400_NG is transmitted to the IP-FAX via the SIP proxy server.

When the IP-FAX receives the 400_NG signal, the IP-FAX transmits the ACK signal to the VoIP-gateway and ends the communication.

Immediately after the transmission, the IP-FAX automatically issues a call to the same destination "0339241111" and transmits the INVITE signal to the SIP proxy server 22. In the present embodiment, in view of the fact that the T.38 capability is declared in the SDP field in the INVITE signal in the previous call and the call connection is rejected by the target communication terminal, only the voice capability is declared in the SDP field of the INVITE signal in a second call taking into consideration operations of the target communication terminal assumed to be a voice terminal and operations of the VoIP-gateway immediately terminating communication when capability other than the voice capability is declared in the SDP field of the INVITE signal.

The SIP proxy server accesses the location server and resolves the Request-URI (information including destination information "0339241111" and domain information) in the received INVITE signal into the IP address of the proxy destination. The proxy server proxies the received INVITE to the IP address obtained as a result of the resolution.

The VoIP-gateway receives the INVITE signal and transmits the 200_OK signal in which the voice capability is declared in the SDP field. The signal is transmitted to the IP-FAX via the SIP proxy server.

When the IP-FAX receives the 200_OK signal, the IP-FAX transmits the ACK signal to the VoIP-gateway and the voice channel is established between the IP-FAX and the VoIP-gateway.

Voice data (RTP) and signals for controlling voice data (RTCP) are exchanged on the established voice channel. When the VoIP-gateway receives and detects T.30 facsimile signals from the G3 facsimile connected to PSTN line, the VoIP-gateway transmits the re-INVITE signal in which the T.38 capability is declared in the SDP field so as to request the IP-FAX for connection of the T.38 channel.

When the IP-FAX receives the re-INVITE signal, the IP-FAX transmits the 200_OK signal in which the T.38 capability is described in the SDP field to the VoIP-gateway.

When the VoIP-gateway receives the 200_OK, the VoIP-gateway transmits the ACK signal to the IP-FAX and the T.38 channel is established between the IP-FAX and the VoIP-gateway.

The IP-FAX transmits facsimile data including image data via the established T.38 channel.

After the transmission of the facsimile data is ended, the voice channel and the T.38 channel are disconnected.

Both terminals transmit the BYE signals to each other and the procedure of SIP is ended.

In the present embodiment, when the IP-FAX confirms that facsimile transmission is normally ended by reissuing the call, the IP-FAX judges the destination to be "a destination prioritizing the voice channel" and stores the destination information "0339241111" in the storage unit 27.

Further, in the present embodiment, the storage unit 27 is searched for a destination corresponding to the call destination specified when the IP-FAX issued the call. Depending on whether the corresponding destination is stored in the storage unit 27 or not, different media types are declared in the SDP field of the INVITE signal of the call.

Through the operation in this manner, it is possible to resolve connectivity to the VoIP device establishing the connection of the voice channel by priority in call issue and call reception of the IP-FAX based on RFC3261(SIP). In accordance with this, it is possible to reliably realize connectivity that is difficult to secure by merely complying with the RFC3261 standard.

A sequence diagram of FIG. 10 shows an example of a case where the destination corresponding to the call destination is stored in the storage unit 27. In FIG. 2, the IP-FAX 21 issues the call to the VoIP-gateway 24.

The user of the IP-FAX performs facsimile transmission specifying a destination "0339245551".

The IP-FAX searches the storage unit 27 for a destination corresponding to the call destination "0339245551". Since the corresponding destination is stored, the IP-FAX judges the destination terminal to be a device prioritizing the voice channel and transmits the INVITE signal in which only the voice capability is declared in the SDP field to the SIP proxy server.

The SIP proxy server accesses the location server and resolves the Request-URI (information including destination information "0339245551" and domain information) in the received INVITE signal into the IP address of the proxy destination. The SIP proxy server proxies the received INVITE to the IP address obtained as a result of the resolution.

The VoIP-gateway receives the INVITE signal and transmits the 200_OK signal in which the voice capability is declared in the SDP field. The signal is transmitted to the IP-FAX via the SIP proxy server.

When the IP-FAX receives the 200_OK signal, the IP-FAX transmits the ACK signal to the VoIP-gateway and the voice channel is established between the IP-FAX and the VoIP-gateway.

Voice data (RTP) and signals for controlling voice data (RTCP) are exchanged on the established voice channel. When the VoIP-gateway receives and detects T.30 facsimile signals from the G3 facsimile connected to PSTN line, the VoIP-gateway transmits the re-INVITE signal in which the T.38 capability is declared in the SDP field so as to request the IP-FAX for connection of the T.38 channel.

When the IP-FAX receives the re-INVITE signal, the IP-FAX transmits the 200_OK signal in which the T.38 capability is described in the SDP field to the VoIP-gateway.

When the VoIP-gateway receives the 200_OK, the VoIP-gateway transmits the ACK signal to the IP-FAX and the T.38 channel is established between the IP-FAX and the VoIP-gateway.

The IP-FAX transmits facsimile data including image data via the established T.38 channel.

After the transmission of the facsimile data is ended, the voice channel and the T.38 channel are disconnected.

Both terminals transmit the BYE signals to each other and the procedure of SIP is ended.

A sequence diagram of FIG. 11 shows an example of a case where the destination corresponding to the call destination is not stored in the storage unit 27. In FIG. 2, the IP-FAX 21 issues the call to the IP-FAX 25.

The user of the IP-FAX 21 performs facsimile transmission specifying a destination "0654449820".

The IP-FAX searches the storage unit 27 for a destination corresponding to the call destination "0654449820". Since the corresponding destination is not stored, the IP-FAX transmits the INVITE signal in which the T.38 capability and the voice capability are declared in the SDP field to the SIP proxy server as a normal operation. The voice capability is also declared in the SDP field taking into consideration a case where the call destination terminal is a VoIP device requiring a voice function.

The SIP proxy server accesses the location server and resolves the Request-URI (information including destination information "0654449820" and domain information) in the received INVITE signal into the IP address of the proxy destination. The SIP proxy server proxies the received INVITE to the IP address obtained as a result of the resolution.

The call receiving IP-FAX 25 receives the INVITE signal and confirms the SDP field in the INVITE signal. Since the T.38 capability is declared in the SDP field, the IP-FAX 25 transmits the 200_OK signal in which the T.38 capability is declared in the SDP field. The 200_OK signal is transmitted to the call issuing IP-FAX 21 via the SIP proxy server.

When the call issuing IP-FAX 21 receives the 200_OK signal, the IP-FAX 21 transmits the ACK signal to the call receiving IP-FAX 25 and the T.38 channel is established between both terminals.

The IP-FAX 21 transmits facsimile data including image data via the established T.38 channel.

After the transmission of the facsimile data is ended, the voice channel and the T.38 channel are disconnected.

Both terminals transmit the BYE signals to each other and the procedure of SIP is ended.

Through the operation in this manner, by storing information on destinations requiring a particular call connection characteristic of vendors, it is possible to separately use the standard call connection procedure and a vendor-specific call connection procedure for destinations specified thereafter. For example, it is possible to perform a general call connection procedure based on the standard in a normal operation and to perform a specific call connection procedure only when a destination indicating a particular vendor device is specified.

The present invention is not limited to the specifically disclosed embodiment, and variations and modifications may be made without departing from the scope of the present invention.

The present application is based on Japanese priority application No. 2006-151928 filed May 31, 2006, the entire contents of which are hereby incorporated herein by reference.

What is claimed is:

1. A network communication apparatus for performing communication via an IP network, the network communication apparatus comprising:
    a packet generation unit configured to generate packets for call connection including facsimile communication capability and voice capability; and
    a communication control unit configured to request a target network communication apparatus for connection using the packets for call connection upon facsimile transmission and establishing a facsimile communication channel and a voice channel so as to perform the facsimile transmission, the communication control unit configured to request the target network communication apparatus for connection using the packets for call connection upon facsimile transmission, the communication control unit is configured to reissue a call, using a second connection request, to the target network communication apparatus and requests the target network communication apparatus for connection of a voice channel so as to establish the voice channel when the target network communication apparatus rejects the connection request which is a first connection request, and the communication control unit is configured to subsequently receive a request for connection of a facsimile communication channel from the target network communication apparatus and establish the facsimile communication channel, wherein the communication control unit operates such that after the voice channel is established, the voice channel is maintained without being immediately disconnected while the facsimile communication channel is used, and the voice channel is disconnected after the facsimile communication has ended.

2. The network communication apparatus according to claim 1, further comprising:
    a memory to store a destination of the target network communication apparatus as destination information, wherein
    the memory is for storing destination information of a destination to which the facsimile communication channel is established by reissuing the call.

3. The network communication apparatus according to claim 2, wherein:
    the communication control unit is configured to compare specified destination information with the destination information stored in the memory upon facsimile transmission, and
    the communication control unit is configured to request the target network communication apparatus for connection of a voice channel so as to establish the voice channel, when corresponding destination information is present, and the communication control unit is configured to subsequently receive a request for connection of a facsimile communication channel from the target network communication apparatus so as to establish the facsimile communication channel.

4. A method for performing communication via an IP network using a network communication apparatus, the method comprising the steps of:
    generating packets for call connection including facsimile communication capability and voice capability;
    requesting a target network communication apparatus for connection using the packets for call connection upon facsimile transmission and establishing a facsimile communication channel and a voice channel so as to perform the facsimile transmission;
    requesting the target network communication apparatus for connection using the packets for call connection upon facsimile transmission;
    reissuing a call, using a second connection request, to the target network communication apparatus and requesting the target network communication apparatus for connection of a voice channel so as to establish the voice channel when the target network communication apparatus rejects the connection request which is a first connection request; and
    receiving a request for connection of a facsimile communication channel from the target network communication apparatus and establishing the facsimile communication channel, wherein after the voice channel is established, the voice channel is maintained without being immediately disconnected while the facsimile communication channel is used, and the voice channel is disconnected after the facsimile communication has ended.

5. The method according to claim 4, further comprising:
    storing a destination of the target network communication apparatus as destination information, the destination information being a destination to which the facsimile communication channel is established by reissuing the call.

6. The method according to claim 5, further comprising:
    comparing specified destination information with the destination information which has been stored;
    requesting the target network communication apparatus for connection of a voice channel so as to establish the voice channel, when corresponding destination information is present; and
    receiving a request for connection of a facsimile communication channel from the target network communication apparatus so as to establish the facsimile communication channel.

7. The network communication apparatus according to claim 2, wherein:
    the memory stores, after a facsimile communication has ended, the destination as a destination for which the voice channel has priority over the facsimile communication channel.

8. The method according to claim 5, further comprising:
    storing, after a facsimile communication has ended, the destination as a destination for which the voice channel has priority over the facsimile communication channel.

9. The network communication apparatus according to claim 1, wherein the facsimile communication channel is a T.38 channel.

10. The method apparatus according to claim 4, wherein the facsimile communication channel is a T.38 channel.

* * * * *